(12) United States Patent
Koike et al.

(10) Patent No.: US 12,276,998 B2
(45) Date of Patent: Apr. 15, 2025

(54) PUSH-TYPE INPUT DEVICE AND PUSH-TYPE SHIFTER DEVICE

(71) Applicant: ALPS ALPINE CO., LTD., Tokyo (JP)

(72) Inventors: Asuka Koike, Miyagi (JP); Shigeru Furuki, Tokyo (JP); Daisaku Sugawara, Tokyo (JP); Masanori Fujita, Miyagi (JP); Masato Fumiwake, Tokyo (JP); Hayate Natsusaka, Miyagi (JP); Yu Takeda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/364,779

(22) Filed: Aug. 3, 2023

(65) Prior Publication Data

US 2024/0019888 A1    Jan. 18, 2024

Related U.S. Application Data

(63) Continuation of application No. PCT/JP2022/000050, filed on Jan. 4, 2022.

(30) Foreign Application Priority Data

Feb. 16, 2021 (JP) ................................ 2021-022837

(51) Int. Cl.
*G05G 1/02* (2006.01)
*F16H 59/02* (2006.01)
(Continued)

(52) U.S. Cl.
CPC ............... *G05G 1/02* (2013.01); *F16H 59/02* (2013.01); *G05G 1/015* (2013.01); *G05G 5/03* (2013.01); *G05G 5/05* (2013.01); *G05G 2505/00* (2013.01)

(58) Field of Classification Search
CPC .. G05G 1/02; G05G 5/03; G05G 5/05; G05G 2505/00; F16H 59/02; H01H 13/60; H01H 19/003
See application file for complete search history.

(56) References Cited

U.S. PATENT DOCUMENTS

| | | | |
|---|---|---|---|
| 10,775,830 B2 * | 9/2020 | Burchard | ................. G05G 1/02 |
| 2011/0284357 A1 | 11/2011 | Yasunaga et al. | |
| 2017/0203208 A1 | 7/2017 | Sato et al. | |

FOREIGN PATENT DOCUMENTS

| | | | |
|---|---|---|---|
| DE | 10319180 A1 * | 11/2004 | ............... G05G 9/06 |
| EP | 2101339 A2 * | 9/2009 | ............. H01H 13/58 |

(Continued)

OTHER PUBLICATIONS

International Search Report for PCT/JP2022/000050 mailed on Mar. 8, 2022.

*Primary Examiner* — William C Joyce
(74) *Attorney, Agent, or Firm* — IPUSA, PLLC

(57) ABSTRACT

A push-type input device according to one embodiment includes: an operation knob configured to receive a pushing operation by an operator; a click sensation-imparting mechanism configured to impart a click sensation to the pushing operation; a slider configured to slide in a predetermined sliding direction in response to the pushing operation; a rotating body configured to rotate in response to sliding of the slider; a sensor configured to detect a rotation angle of the rotating body; and a determination section configured to perform a switch-on determination based on a detection result of the rotation angle by the sensor. The determination section performs the switch-on determination between the rotation angle of the rotating body corresponding to the maximum load in load characteristics of the pushing opera- (Continued)

tion and the rotation angle of the rotating body corresponding to the minimum load in load characteristics of the pushing operation.

14 Claims, 13 Drawing Sheets

(51) Int. Cl.
*G05G 1/015* (2008.04)
*G05G 5/03* (2008.04)
*G05G 5/05* (2006.01)

(56) References Cited

FOREIGN PATENT DOCUMENTS

| | | | |
|---|---|---|---|
| EP | 2752865 A1 * | 7/2014 | ............. H01H 19/11 |
| JP | 2006-004914 | 1/2006 | |
| JP | 2011-243476 | 12/2011 | |
| JP | 2019-219948 | 12/2019 | |
| WO | 2016/051986 | 4/2016 | |

* cited by examiner

PUSH-TYPE INPUT DEVICE AND PUSH-TYPE SHIFTER DEVICE

CROSS-REFERENCE TO RELATED APPLICATION

This application is a continuation application of International Application No. PCT/JP2022/000050 filed on Jan. 4, 2022, and designated the U.S., which is based upon and claims priority to Japanese Patent Application No. 2021-022837, filed on Feb. 16, 2021, the entire contents of which are incorporated herein by reference.

BACKGROUND

1. Field of the Invention

The present invention relates to a push-type input device and a push-type shifter device.

2. Description of the Related Art

Patent Literature 1 below relates to a push switch used in, for example, input operation sections of various electronic devices, and discloses a technique in which a movable contact is elastically reversed in response to a pushing operation of an operation button, and the movable contact and a fixed contact are electrically conducted, thereby achieving switch-on.

CITATION LIST

Patent Literature

Patent Literature 1: Japanese Laid-Open Patent Publication No. 2011-243476

Meanwhile, conventional push switches utilize a technique of imparting a click sensation to a pushing operation by providing a dome-shaped movable contact that is elastically deformable. In such conventional push switches, however, for switching to a switch-on state, operators, who felt a click sensation caused by the dome that is reversing in motion, need to further push in the operation button until electrical conduction is reliably achieved, even after the dome-shaped movable contact has contacted the fixed contact on the top surface of a board. Therefore, conventional push switches have not been able to provide a more intuitive and reliable pushing operation involving a click operation sensation via an operation button.

SUMMARY

A push-type input device according to one embodiment includes: an operation knob configured to receive a pushing operation by an operator; a click sensation-imparting mechanism configured to impart a click sensation to the pushing operation; a slider configured to slide in a predetermined sliding direction in response to the pushing operation; a rotating body configured to rotate in response to sliding of the slider; a sensor configured to detect a rotation angle of the rotating body; and a determination section configured to perform a switch-on determination based on a detection result of the rotation angle by the sensor. The determination section performs the switch-on determination between the rotation angle of the rotating body corresponding to the maximum load in load characteristics of the pushing operation and the rotation angle of the rotating body corresponding to the minimum load in load characteristics of the pushing operation.

DESCRIPTION OF THE EMBODIMENTS

Hereinafter, one embodiment will be described with reference to the drawings.

(Overview of Push-Type Shifter Device 10)

Figure 1:
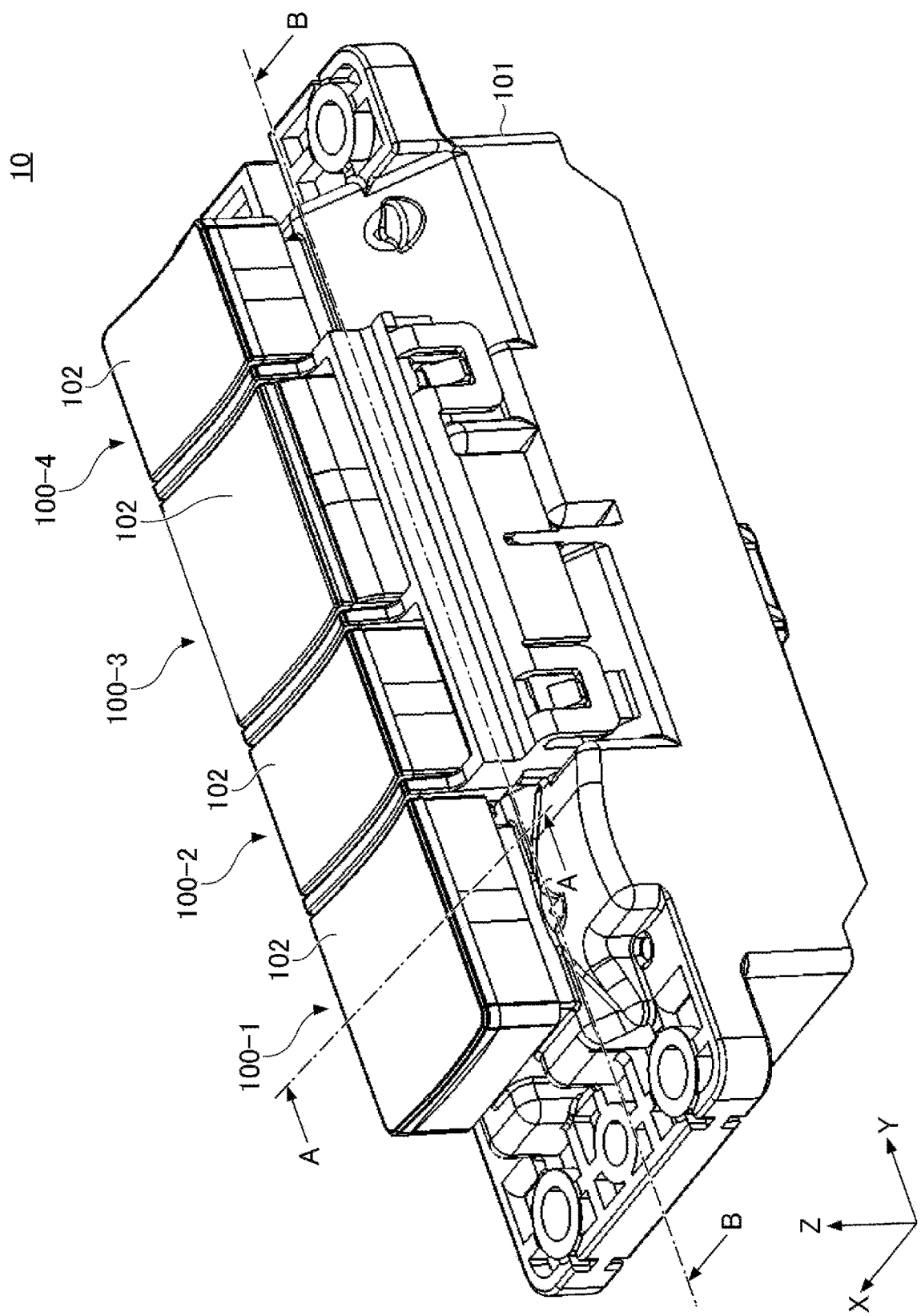
FIG. 1 is a perspective view of an outer appearance of a push-type shifter device according to one embodiment.

FIG. 1 is a perspective view of an outer appearance of a push-type shifter device 10 according to one embodiment. Note that, in the following description, for the sake of convenience, an X-axis direction is referred to as a forward-and-backward direction, a Y-axis direction is referred to as a leftward-and-rightward direction, and a Z-axis direction is referred to as an upward-and-downward direction. Here, a positive X-axis direction is referred to as a forward direction, a positive Y-axis direction is referred to a rightward direction, and a positive Z-axis direction is referred to an upward direction. These indicate relative positional relationships in a device, and do not limit a setting direction and an operating direction of the device. All devices having equivalent relative positional relationships in the devices are encompassed by the claimed scope of the present invention regardless of differences in the setting direction and the operating direction of the devices.

The push-type shifter device 10 as illustrated in FIG. 1 is mounted in a vehicle such as an automobile and is used for a shift-change operation of the vehicle. As illustrated in FIG. 1, the push-type shifter device 10 includes four push-type input devices 100 (100-1 to 100-4) and a casing 101. The four push-type input devices 100 are aligned in a row in the leftward-and-rightward direction (Y-axis direction) and integrated by the single casing 101. Each of the four push-type input devices 100 includes an operation knob 102 at the uppermost part thereof. Through the pushing operation of the operation knob 102, it is possible to perform the shift-change operation to a shift position corresponding to the operation knob 102.

(Configuration of Push-Type Input Device 100)

Figure 2:
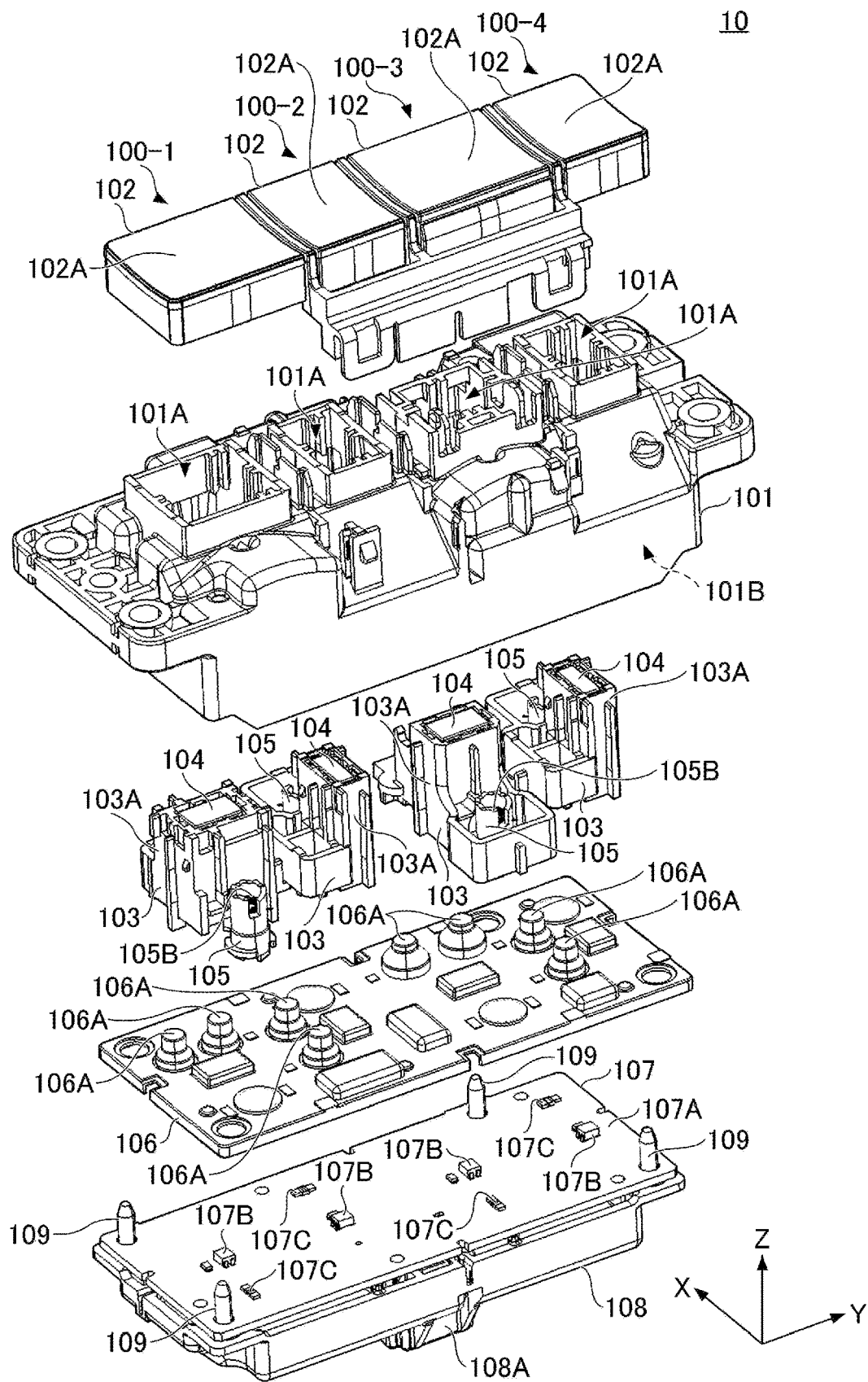
FIG. 2 is an exploded perspective view of the push-type shifter device according to one embodiment.
Figure 3:
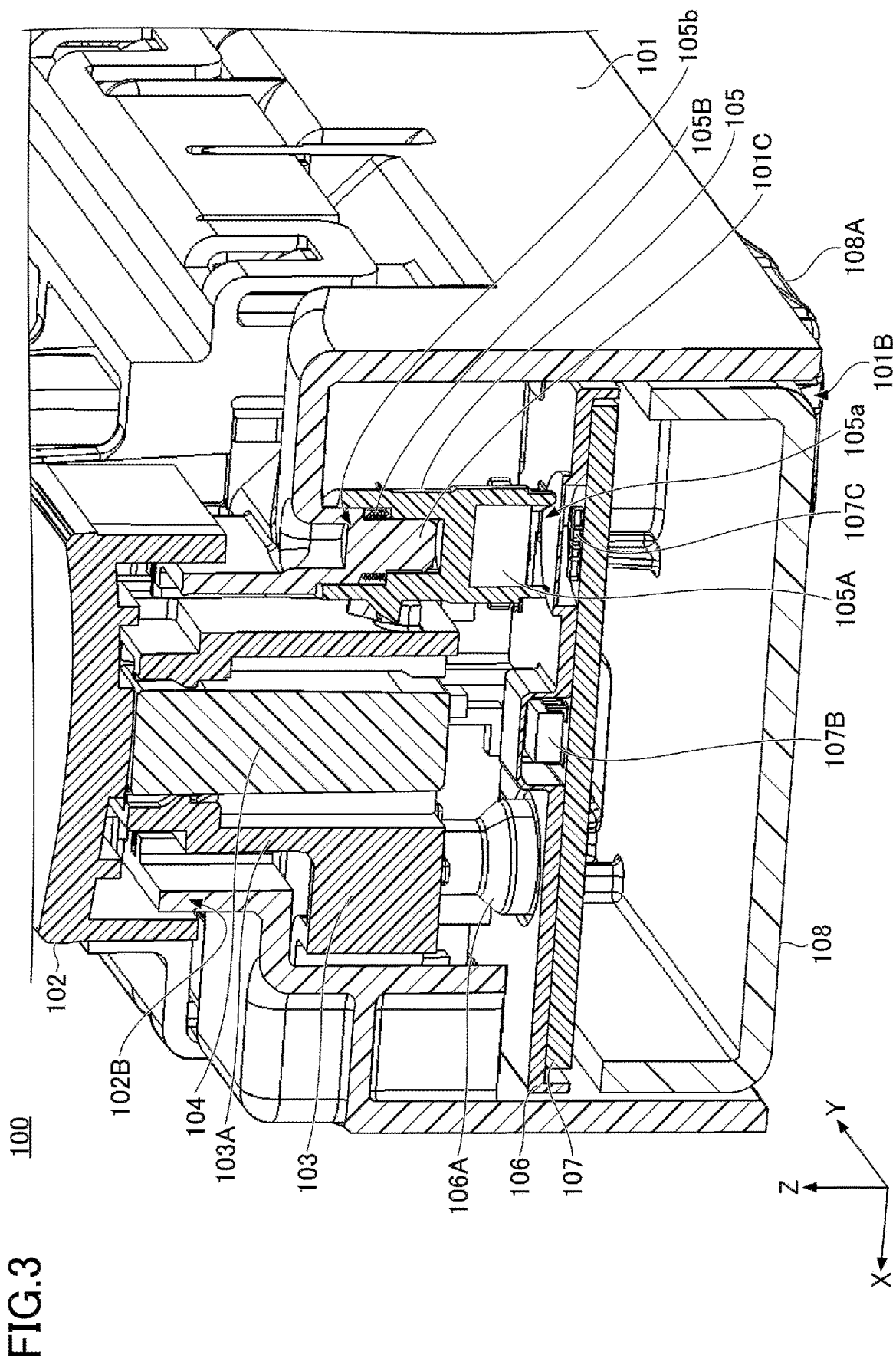
FIG. 3 is a cross-sectional perspective view of the push-type shifter device according to one embodiment.
Figure 4:
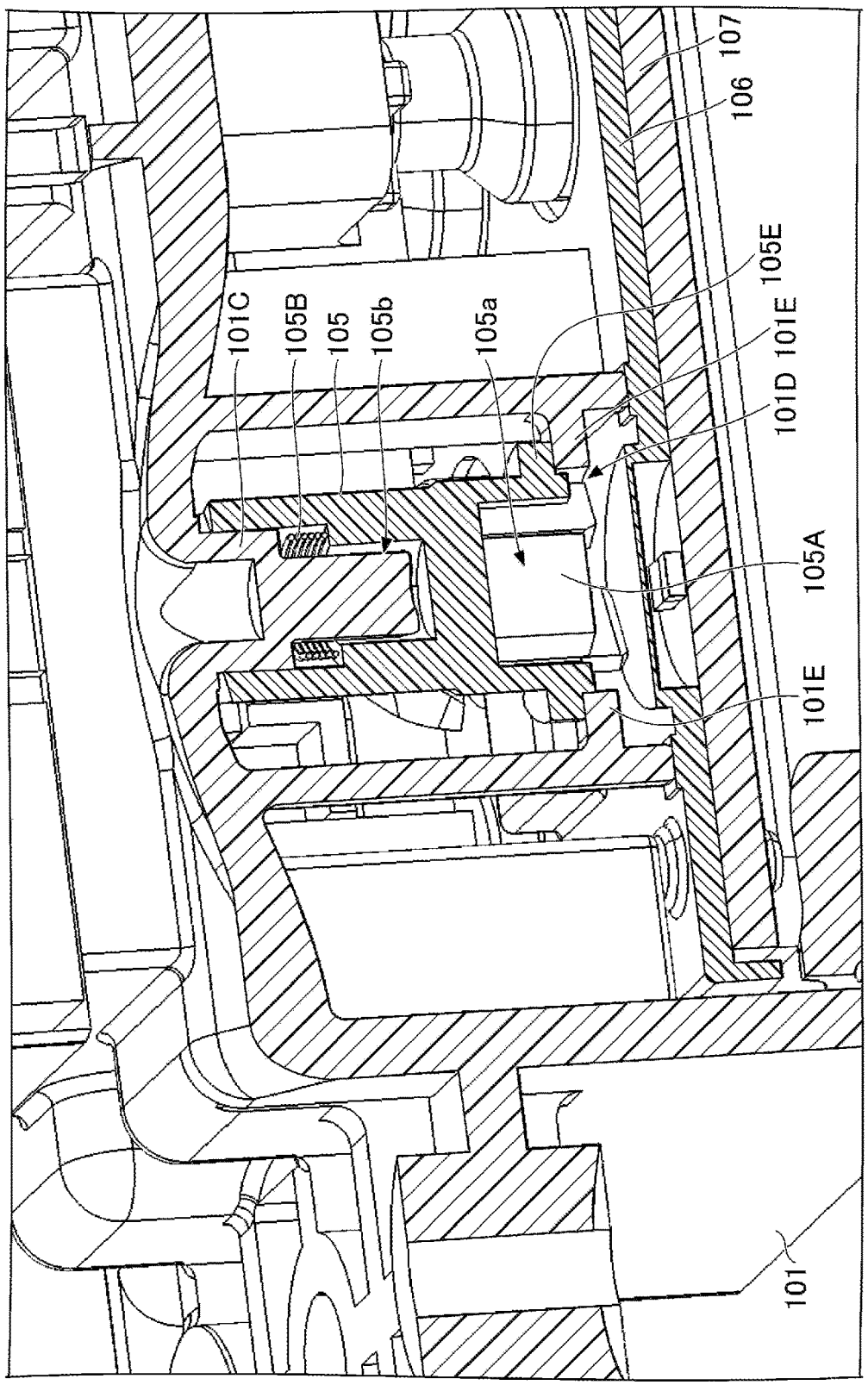
FIG. 4 is a partially enlarged cross-sectional perspective view of the push-type shifter device according to one embodiment.

FIG. 2 is an exploded perspective view of the push-type shifter device 10 according to one embodiment. FIG. 3 is a cross-sectional perspective view of the push-type shifter device 10 according to one embodiment. FIG. 4 is a partially enlarged cross-sectional perspective view of the push-type shifter device 10 according to one embodiment. Note that, FIG. 3 illustrates a cross-section of the push-type input device 100-1 included in the push-type shifter device 10, taken along an XZ plane (a cross-section taken along an A-A cross-sectional line illustrated in FIG. 1). Also, FIG. 4 illustrates a cross-section of the push-type input device 100-1 (especially, a rotating body 105) included in the push-type shifter device 10, taken along a YZ plane (a cross-section taken along a B-B cross-sectional line illustrated in FIG. 2).

As illustrated in FIG. 2, each of the four push-type input devices 100-1 to 100-4 includes the operation knob 102, the casing 101, a slider 103, a light guide 104, the rotating body 105, a rubber sheet 106, a board 107, and a cover 108.

The operation knob 102 is a part that is formed of a resin and configured to receive a pushing operation from an operator. In the example as illustrated in FIG. 2, the operation knob 102 has a generally rectangular parallelepiped shape. Also, the top surface of the operation knob 102 is an operation surface 102A for receiving the pushing operation that is generally horizontal and slightly curved in a recessed shape. Also, the entirety of a portion corresponding to the bottom surface of the operation knob 102 is a lower opening 102B. The operation knob 102 is attached and fixed to the top portion of the slider 103 by the top portion of the slider 103 being fitted into the lower opening 102B from a lower side (negative Z-axis side). Thereby, the operation knob 102 can move together with the slider 103 in the upward-and-downward direction (Z-axis direction). In other words, the operation knob 102 can slide the slider 103 downward (negative Z-axis direction) by performing the pushing operation to the operation surface 102A.

The casing 101 is a vessel-shaped part that is formed of a resin, and has a generally rectangular parallelepiped shape and a hollow structure. In the interior of the casing 101, the slider 103, the light guide 104, the rotating body 105, the rubber sheet 106, and the board 107 are housed. In the top surface of the casing 101, an upper opening 101A having a rectangular shape in a plan view is formed. The slider 103 is disposed in the upper opening 101A so as to be slidable in the upward-and-downward direction (Z-axis direction). Also, the entirety of a portion corresponding to the bottom surface of the casing 101 is a lower opening 101B. The lower opening 101B is covered with the cover 108. Also, as illustrated in FIG. 3, in the interior of the casing 101, a cylindrical pivotally supporting portion 101C hanging down from a ceiling surface is provided. As illustrated in FIG. 3, the pivotally supporting portion 101C rotatably supports the upper portion of the rotating body 105 by being inserted into an upper opening 105b of the rotating body 105. Also, as illustrated in FIG. 4, in the interior of the casing 101, a pair of supporting portions 101E facing each other across a bearing opening 101D is provided. Also, as illustrated in FIG. 4, at the lower end portion of the rotating body 105, a flange 105E enlarged in a radial direction from the outer peripheral surface of the rotating body 105 is provided. The diameter of the flange 105E is larger than the diameter of the bearing opening 101D. As illustrated in FIG. 4, the lower end portion of the rotating body 105 is fitted into the bearing opening 101D. At this time, the flange 105E of the rotating body 105 contacts the top surfaces of the pair of supporting portions 101E. Thereby, the lower portion of the rotating body 105 is rotatably supported; i.e., the rotating body 105 is restricted from moving downward.

The slider 103 is a part that is formed of a resin and disposed in the upper opening 101A of the casing 101 so as to be slidable in the upward-and-downward direction (Z-axis direction) (one example of the "predetermined sliding direction"). The slider 103 has a cylinder portion 103A of a generally rectangular cylindrical shape, with the cylinder portion thereof extending in the upward-and-downward direction (Z-axis direction).

The light guide 104 is a rectangular cylindrical part that is formed of a resin, and is disposed in the cylinder portion 103A of the slider 103. The light guide 104 emits, from the top surface of the light guide 104, light that is emitted from a LED 107B mounted on a top surface 107A of the board 107 and incident on the bottom surface of the light guide 104. Thereby, the light guide 104 guides the light emitted from the LED 107B toward the operation knob 102.

The rotating body 105 is a generally cylindrical member, with the cylinder portion thereof extending in the upward-and-downward direction. The rotating body 105 is disposed laterally to the slider 103 so as to be rotatable about a rotation axis whose direction is the upward-and-downward direction (Z-axis direction). The outer peripheral surface of the rotating body 105 is engaged with the slider 103 so as to rotate in accordance with sliding of the slider 103 in the upward-and-downward direction (details for the engagement will be described below). As illustrated in FIG. 3, a magnet 105A is embedded in the lower opening 105a of the rotating body 105. Also, as illustrated in FIG. 3, the pivotally supporting portion 101C of the casing 101 is inserted into the upper opening 105b of the rotating body 105. Thereby, the rotating body 105 is supported by the casing 101 so as to be rotatable. Also, in the upper opening 105b of the rotating body 105, an annular torsion spring 105B (one example of "biasing unit") is provided around the pivotally supporting portion 101C of the casing 101. One end portion of the torsion spring 105B is fixed to the pivotally supporting portion 101C, and the other end portion of the torsion spring 105B is fixed to the rotating body 105. By an elastic force generated by the torsion spring 105B, the rotating body 105 is always biased counterclockwise as viewed from above (returning rotational direction). After the rotating body 105 rotates clockwise as viewed from above in accordance with downward (negative Z-axis direction) sliding of the slider 103 by the pushing operation, when the pushing operation is released, the rotating body 105 can rotate counterclockwise as viewed from above (returning rotational direction) by the elastic force generated by the torsion spring 105B. Thereby, the rotating body 105 can rotate and return to the initial position of the rotating body 105 in accordance with a motion in which a rubber dome 106A of the rubber sheet 106 described below pushes the slider 103 upward (positive Z-axis direction) and the slider 103 returns to the initial position thereof before the pushing operation.

The rubber sheet 106 is a sheet-shaped member overlaid on the top surface 107A of the board 107. The rubber sheet 106 is formed using an elastic material (e.g., silicone rubber). The rubber sheet 106 covers the entirety of the top surface 107A of the board 107. Thereby, even if water enters the interior of the casing 101, the top surface 107A of the board 107 can be suppressed from becoming wet.

Also, the rubber sheet 106 is integrally provided with two rubber domes 106A at positions facing the bottom surfaces of the respective sliders 103. Each of the rubber domes 106A is one example of the "click sensation-imparting mechanism". The rubber dome 106A is formed in a projecting shape that projects upward from the top surface of the rubber sheet 106. In response to the pushing operation, the rubber dome 106A is compressed by the bottom surface of the slider 103. Thereby, the dome portion thereof elastically deforms (is bent in a reversed manner) to impart the click operation sensation to the pushing operation. Also, as described above, when the pushing operation is released, the rubber dome 106A pushes the slider 103 upward (positive Z-axis direction) by the elastic force (returning force to the initial shape) generated by the rubber dome 106A, and can return the slider 103 to the initial position thereof before the pushing operation.

The board 107 is a flat plate-shaped part. The board 107 has a rectangular shape in a plan view. The board 107 is set and fixed to the top surface of the cover 108 in the interior of the casing 101, with the board 107 being in parallel to the XY plane. As the board 107, for example, a PWB (Printed Wiring Board) is used. On the top surface 107A of the board 107, a LED (Light Emitting Diode) 107B and a magnetic sensor 107C are mounted.

The LED 107B is provided at a position directly below the light guide 104. The LED 107B can emit light by control from an externally provided control device 120 (see FIG. 5). By emitting light, the LED 107B can emit the light into the light guide 104.

The magnetic sensor 107C is provided at a position directly below the rotating body 105, and faces the magnet 105A provided at the lower end surface of the rotating body 105. By detecting change in a magnetic-flux direction in accordance with the rotation of the magnet 105A, the magnetic sensor 107C can detect the rotation angle of the rotating body 105. Then, the magnetic sensor 107C can output, via a connector 108A, a rotation angle signal representing the detected rotation angle to the externally provided control device 120 (see FIG. 5). Note that, the push-type input device 100 according to one embodiment uses the magnetic sensor 107C (GMR sensor) as one example of the "sensor" for detecting the rotation angle. However, a magnetic sensor employable is not limited thereto, and the push-type input device 100 may use a sensor of another type (e.g., an optical type, a mechanical type, an electrostatic type, or a resistive type) as another example of the "sensor" for detecting the rotation angle.

The cover 108 is a flat plate-shaped part that is formed of a resin and covers the lower opening 101B of the casing 101. The cover 108 is screw-fastened and fixed to the casing 101 with four screws 109 penetrating the cover 108. On the bottom surface of the cover 108, the connector 108A of a rectangular cylindrical shape is provided so as to project downward. In the interior of the connector 108A, a plurality of connector pins (not illustrated) hanging downward from the bottom surface of the board 107 are disposed. The connector 108A electrically connects the plurality of connector pins to an external connector (not illustrated) through fitting of the external connector into the external connector.

(Electrical Configuration of Push-Type Shifter Device 10)

Figure 5:
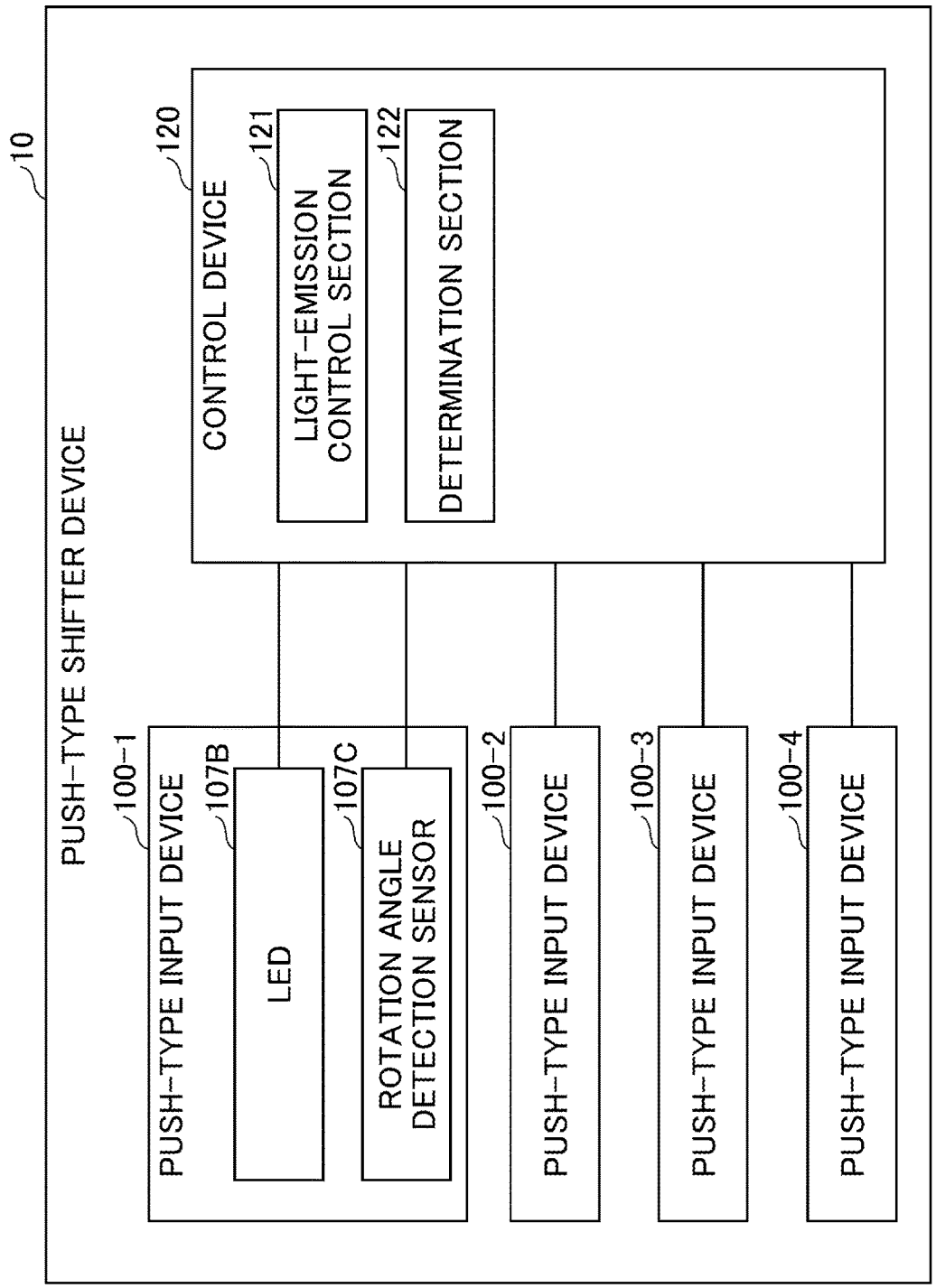
FIG. 5 is an electrical configuration of the push-type shifter device according to one embodiment.

FIG. 5 is an electrical configuration of the push-type shifter device 10 according to one embodiment. As illustrated in FIG. 5, the push-type shifter device 10 includes the four push-type input devices 100-1 to 100-4, and the control device 120. Also, each push-type input device 100 includes the LED 107B and the magnetic sensor 107C.

The control device 120 is connected to the LED 107B and the magnetic sensor 107C included in the push-type input device 100 via the connector 108A included in the push-type shifter device 10 (see FIG. 2 and FIG. 3). The control device 120 includes a light-emission control section 121 and a determination section 122.

The light-emission control section 121 is configured to control light emission of the LED 107B included in the push-type input device 100. The determination section 122 performs a switch-on determination by the pushing operation for the push-type input device 100 based on the detected signal sent from the magnetic sensor 107C included in the push-type input device 100 (i.e., a detection result of the rotation angle obtained by the magnetic sensor 107C).

(Upper Sliding Portion 103B and Lower Sliding Portion 103C of Slider 103)

Figure 6:
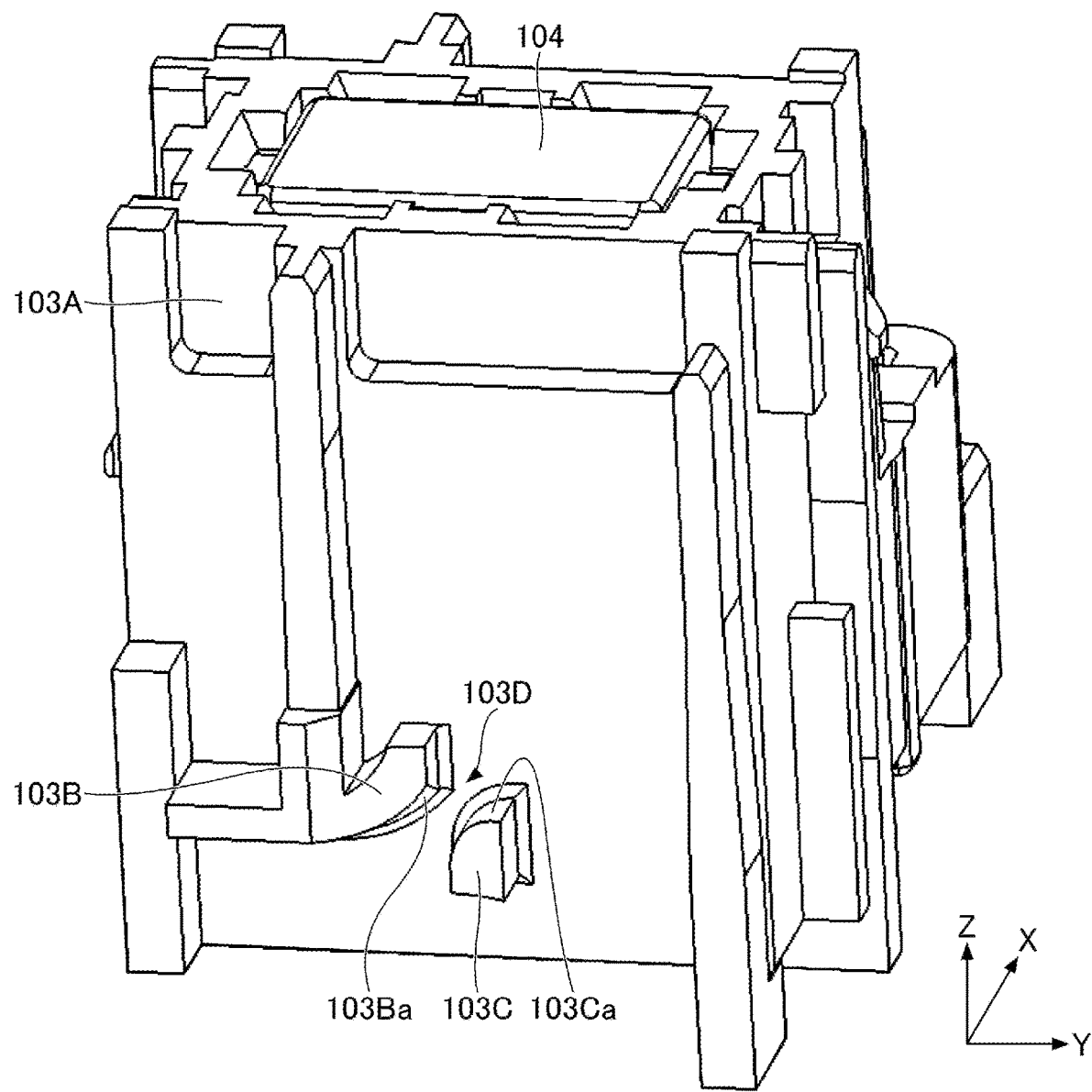
FIG. 6 is a perspective view of an outer appearance of a slider included in a push-type input device according to one embodiment.

FIG. 6 is a perspective view of the outer appearance of the slider 103 included in the push-type input device 100-1 according to one embodiment. FIG. 6 illustrates a back-side (negative X-axis side) lateral surface of the cylinder portion 103A of the slider 103 included in the push-type input device 100-1. As illustrated in FIG. 6, on the back-side (negative X-axis side) lateral surface of the cylinder portion 103A of the slider 103 included in the push-type input device 100-1, the upper sliding portion 103B and the lower sliding portion 103C are provided so as to be projecting.

The upper sliding portion 103B is provided slightly above (positive Z-axis direction) and slightly leftward (negative Y-axis direction) of the lower sliding portion 103C. A gap 103D is formed between the upper sliding portion 103B and the lower sliding portion 103C. The upper sliding portion 103B has an upper sliding surface 103Ba that is a curved surface facing the gap 103D (a projecting surface toward the gap 103D). The lower sliding portion 103C has a lower sliding surface 103Ca that is a curved surface facing the gap 103D (a projecting surface toward the gap 103D). The upper sliding portion 103B and the lower sliding portion 103C are provided at positions facing each other via a cam portion 105D described below (see FIG. 8 and FIG. 9).

(Cam Portion 105D of Rotating Body 105)

Figure 7:
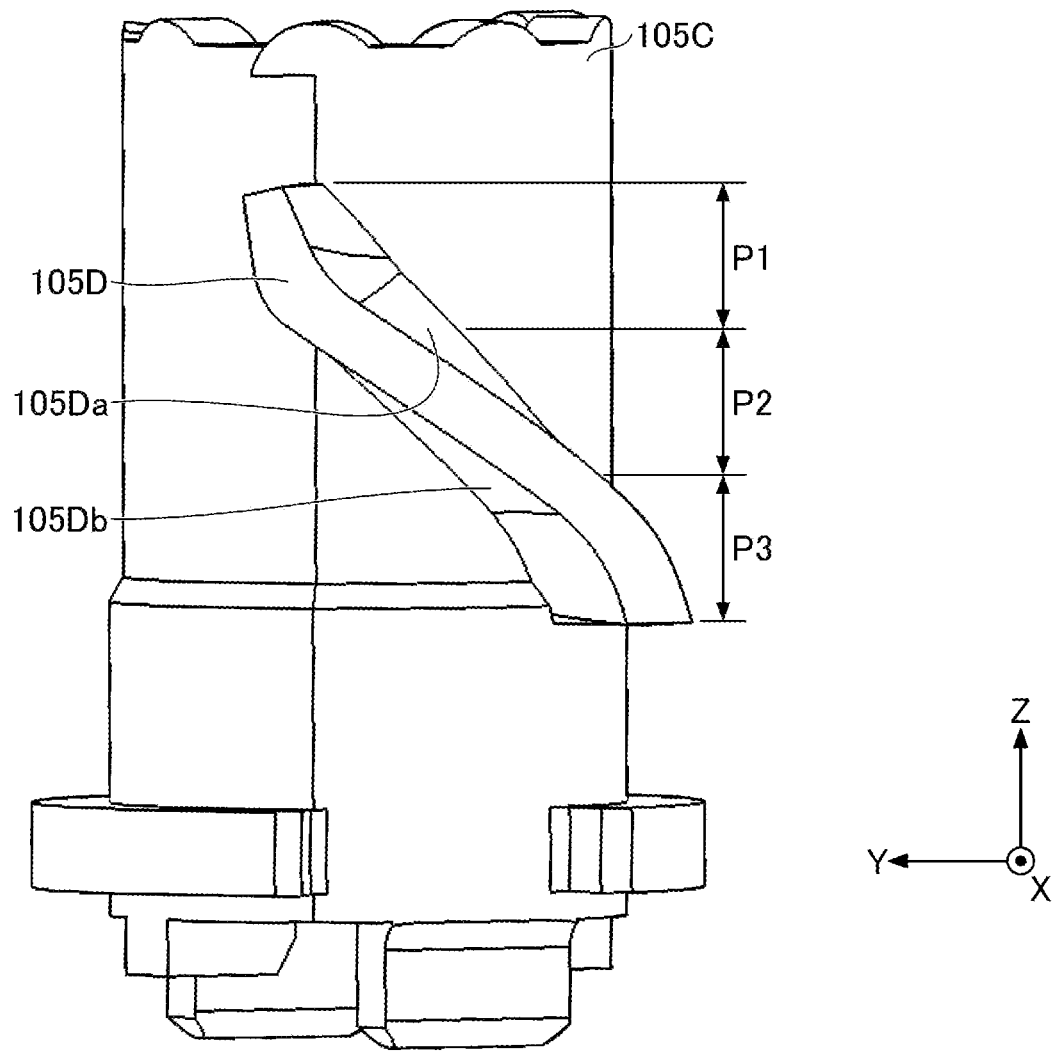
FIG. 7 is a side view of a rotating body included in the push-type input device according to one embodiment.

FIG. 7 is a side view of the rotating body 105 included in the push-type input device 100-1 according to one embodiment. FIG. 7 illustrates the outer peripheral surface 105C on the front side (positive X-axis side) of the rotating body 105 included in the push-type input device 100-1. As illustrated in FIG. 7, in the rotating body 105 included in the push-type input device 100-1, the cam portion 105D that is helical is provided on the outer peripheral surface 105C on the front side (positive X-axis side) so as to be projecting. The cam portion 105D extends to contour the outer peripheral surface 105C counterclockwise as viewed from above, from the upper end portion toward the lower end portion. Also, the cam portion 105D is helically formed so that the height position thereof becomes gradually lower from the upper end portion toward the lower end portion. An inclined surface on the upper side of the cam portion 105D is an upper cam surface 105Da (one example of "cam surface") and the upper sliding surface 103Ba (see FIG. 6) of the slider 103 can slide in contact with the upper cam surface 105Da. The upper cam surface 105Da converts a sliding force of the slider 103 to a rotating force of the rotating body 105. Also, an inclined surface on the rear side (lower side) of the upper cam surface 105Da of the cam portion 105D is a lower cam surface 105db and the lower sliding surface 103Ca (see FIG. 6) of the slider 103 can slide in contact with the lower cam surface 105db.

Note that, as illustrated in FIG. 7, the upper cam surface 105Da has a rotation starting portion P1, a rotation intermediate portion P2, and a rotation ending portion P3.

The rotation starting portion P1 is a portion where the upper sliding portion 103B of the slider 103 slides until a stroke amount of the operation knob 102 reaches a stroke amount S1 (corresponding to a "rotation starting time of the rotating body").

The rotation intermediate portion P2 is a portion where the upper sliding portion 103B of the slider 103 slides until a stroke amount of the operation knob 102 reaches a stroke amount S2 from the stroke amount S1 (corresponding to a "rotation intermediate time of the rotating body").

The rotation ending portion P3 is a portion where the upper sliding portion 103B of the slider 103 slides after a stroke amount of the operation knob 102 has reached the stroke amount S2 (corresponding to a "rotation ending time of the rotating body").

(Engagement State Between Slider 103 and Rotating Body 105)

Figure 8:
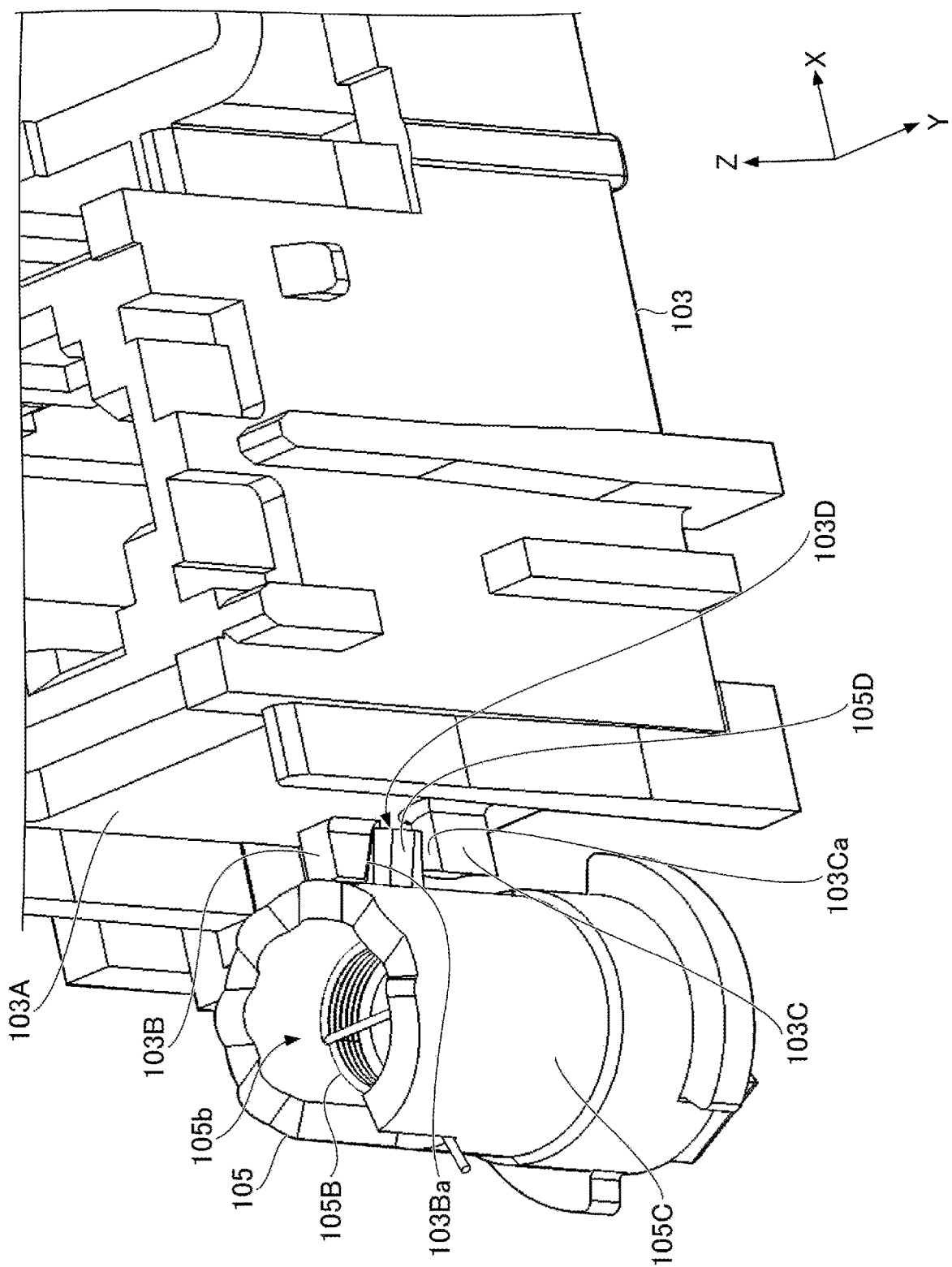
FIG. 8 illustrates an engagement state between a cam portion of the rotating body, and an upper sliding portion and a lower sliding portion of the slider in the push-type input device according to one embodiment.
Figure 9:
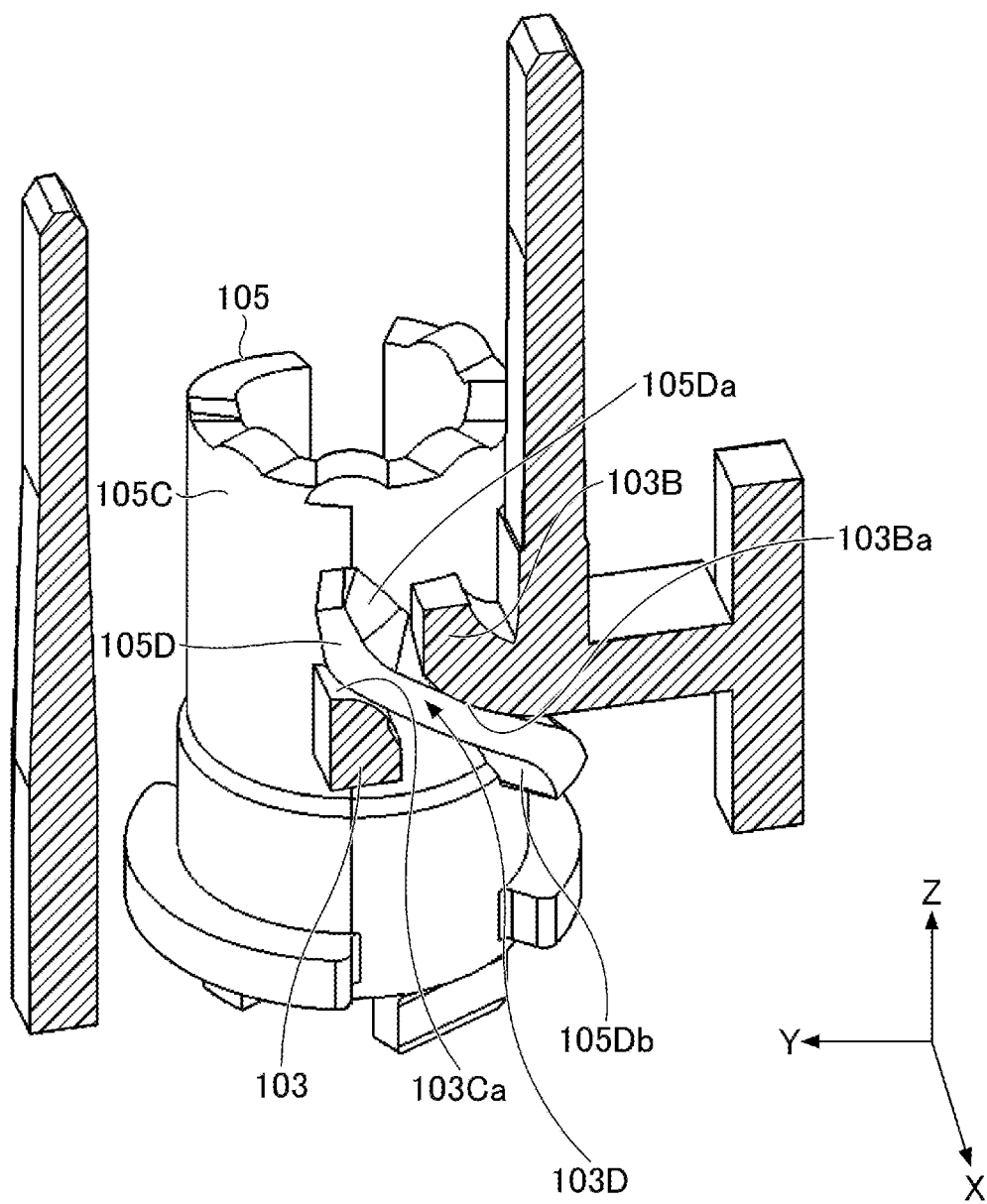
FIG. 9 illustrates an engagement state between the cam portion of the rotating body, and the upper sliding portion and the lower sliding portion of the slider in the push-type input device according to one embodiment.

FIG. 8 and FIG. 9 illustrate an engagement state between the cam portion 105D of the rotating body 105, and the upper sliding portion 103B and the lower sliding portion 103C of the slider 103 in the push-type input device 100-1 according to one embodiment. Note that, FIG. 8 is a perspective view of the outer appearance of the slider 103 and the rotating body 105 as viewed from above (positive Z-axis direction) and rightward (positive Y-axis positive). Also, FIG. 9 is a cross-sectional view, taken along a YZ plane, of the slider 103 and the rotating body 105 as viewed from front (positive X-axis direction), with only the slider 103 being illustrated as a cross section thereof.

As illustrated in FIG. 8 and FIG. 9, the cam portion 105D of the rotating body 105 is disposed in the gap 103D between the upper sliding portion 103B and the lower sliding portion 103C in the slider 103. Thereby, as illustrated in FIG. 9, the upper cam surface 105Da of the cam portion 105D can slide in contact with the upper sliding surface 103Ba of the upper sliding portion 103B. Also, as illustrated in FIG. 9, the lower cam surface 105db of the cam portion 105D can slide in contact with the lower sliding surface 103Ca of the lower sliding portion 103C.

Thereby, when the slider 103 moves downward (negative Z-axis direction) in response to the pushing operation of the operation knob 102, the push-type input device 100-1 according to one embodiment rotationally drives the rotating body 105 clockwise as viewed from above, while the upper sliding surface 103Ba of the upper sliding portion 103B provided in the slider 103 is sliding over the upper cam surface 105Da of the cam portion 105D provided in the rotating body 105 toward the lower end portion thereof. Thereby, the push-type input device 100-1 according to one embodiment can rotationally drive the rotating body 105 clockwise as viewed from above in response to the pushing operation of the operation knob 102. Also, by the elastic force generated by the torsion spring 105B, the rotating body 105 is always biased counterclockwise as viewed from above (returning rotational direction). Thus, the upper cam surface 105Da of the cam portion 105D is always in contact with the upper sliding surface 103Ba of the upper sliding portion 103B. Therefore, according to the push-type input device 100-1 according to one embodiment, the rotating body 105 will not rotate separately from the slider 103 even in the presence of a vibration or impact, and it is possible to reliably achieve the rotation angle of the rotating body 105 in response to the pushing operation, commensurately with an amount by which the slider 103 moves downward (negative Z-axis direction).

Also, according to the push-type input device 100-1 according to one embodiment, when the pushing operation of the operation knob 102 is released, the rotating body 105 can rotate counterclockwise as viewed from above by the elastic force generated by the torsion spring 105B provided in the upper opening 105b of the rotating body 105. Thereby, according to the push-type input device 100-1 according to one embodiment, the upper cam surface 105Da of the cam portion 105D provided in the rotating body 105 always contacts and slides over the upper sliding surface 103Ba of the upper sliding portion 103B provided in the slider 103, and the rotating body 105 rotates by following an upward (positive Z-axis direction) movement of the slider 103 by the elastic force of the rubber dome 106A. As a result, according to the push-type input device 100-1 according to one embodiment, the slider 103 is pushed upward (positive Z-axis direction) by the rubber dome 106A and the slider 103 can be returned to the initial position before the pushing operation, and the rotating body 105 can be returned to the initial position.

Also, according to the push-type input device 100-1 according to one embodiment, the slider 103 includes the lower sliding portion 103C. Thereby, the push-type input device 100-1 according to one embodiment can work even in the following case. Specifically, regardless of the upward movement of the slider 103 by the biasing force from the rubber dome 106A after release of the pushing operation of the operation knob 102, failure of the rotating body 105 to rotate in the returning rotational direction (counterclockwise direction as viewed from above) by the elastic force generated by the torsion spring 105B occurs due to the rotating body 105 being stuck by foreign matter or the like and thus, the rotating body 105 is unable to rotate in accordance with the upward movement of the slider 103. Even in this case, the lower sliding portion 103C of the slider 103 located away via the gap from the lower cam surface 105db of the cam portion 105D in a normal returned state is moved upward by an upward pushing force of the rubber dome 106A, and then contacts the lower cam surface 105db of the cam portion 105D provided in the rotating body 105 that is stopping at that place. Thereby, while the lower sliding portion 103C of the slider 103 is sliding over the lower cam surface 105db toward the upper end portion thereof, the rotating body 105 can be rotationally driven in the returning rotational direction (counterclockwise direction as viewed from above). Thereby, according to the push-type input device 100-1 according to one embodiment, even when the rotating body 105 cannot be rotationally driven only by the elastic force generated by the torsion spring 105B due to the stuck by foreign matter or the like, it is possible to forcedly rotate the rotating body 105 in the returning rotational direction (counterclockwise direction as viewed from above) and reliably return the rotating body 105 to the initial rotation angle before the pushing operation.

Further, according to the push-type input device 100-1 according to one embodiment, even if the cam portion 105D or both of the upper sliding portion 103B and the lower sliding portion 103C of the slider 103 is or are broken and lost, it is possible to return the rotating body 105 to the initial rotation angle by the biasing force from the torsion spring 105B toward the returning rotational direction.

Note that, the gap 103D between the upper sliding portion 103B and the lower sliding portion 103C is provided with a slight clearance to the cam portion 105D so that the cam portion 105D can smoothly slide in the gap 103D. This clearance has a risk of causing rattling of the cam portion 105D in the gap 103D.

However, as described above, the push-type input device 100-1 according to one embodiment biases the cam portion 105D so as to rotate counterclockwise as viewed from above, by the biasing force generated by the torsion spring 105B provided in the rotating body 105. Thereby, the push-type input device 100-1 according to one embodiment can always bias the cam portion 105D in such a direction as to contact the upper sliding portion 103B. That is, the push-type input device 100-1 according to one embodiment can suppress rattling by biasing the cam portion 105D toward one side in the gap 103D. Therefore, even in receipt of an impact or vibration, it is possible to suppress instability in the rotation angle of the rotating body 105 due to rattling of the cam portion 105D.

Further, as described above, by always biasing the cam portion 105D in such a direction as to contact the upper sliding portion 103B, the push-type input device 100-1 according to one embodiment can suppress preceding rotation (excessive rotation) of the rotating body 105 in response to a rapid operation of the slider 103. Therefore, the rotational movement of the rotating body 105 can reliably follow the sliding of the slider 103 in the upward-and-downward direction (Z-axis direction).

Also, a slight clearance for smoothly rotating the rotating body 105 is provided between the rotating body 105 and the parts supporting the rotating body 105 so as to be rotatable (the pivotally supporting portion 101C and the pair of supporting portions 101E of the casing 101 (see FIG. 4)). This clearance has a risk of causing rattling of the rotating body 105 in the horizontal direction and the upward-and-downward direction. In view thereof, in the push-type input device 100-1 according to one embodiment, each of the upper sliding surface 103Ba and the upper cam surface 105Da is inclined to have a predetermined inclination angle so that the height position thereof gradually decreases outward in a radial direction of the rotating body 105. Owing to this inclination, the plate thickness of the cam portion 105D in the rotation-center-axis direction (upward-and-downward direction) is set to be thinner from an inner portion toward an outer portion in the radial direction. This inclination causes the rotating body 105 to generate a reaction force in a perpendicular direction to the inclined surface of the upper cam surface 105Da when the upper cam surface 105Da is pushed onto the upper sliding surface 103Ba by the biasing force from the torsion spring 105B. Components of this reaction force are a downward reaction force (the supporting portion 101E-oriented) and a parallel reaction force (the rotation center axis-oriented). The push-type input device 100-1 according to one embodiment utilizes this reaction force to be able to bias the rotating body 105 downward (the supporting portion 101E-oriented) and parallelly (the rotation center axis-oriented) to move the rotating body 105 to one side in the above-described clearance between the rotating body 105 and the parts supporting the rotating body 105 so as to be rotatable. Therefore, the push-type input device 100-1 according to one embodiment can suppress rattling of the rotating body 105 in the horizontal direction and the upward-and-downward direction, and stably rotate the rotating body 105. Therefore, the rotational movement of the rotating body 105 can reliably follow the sliding of the slider 103 in the upward-and-downward direction (Z-axis direction).

(Load Characteristics of Pushing Operation)

Figure 10:
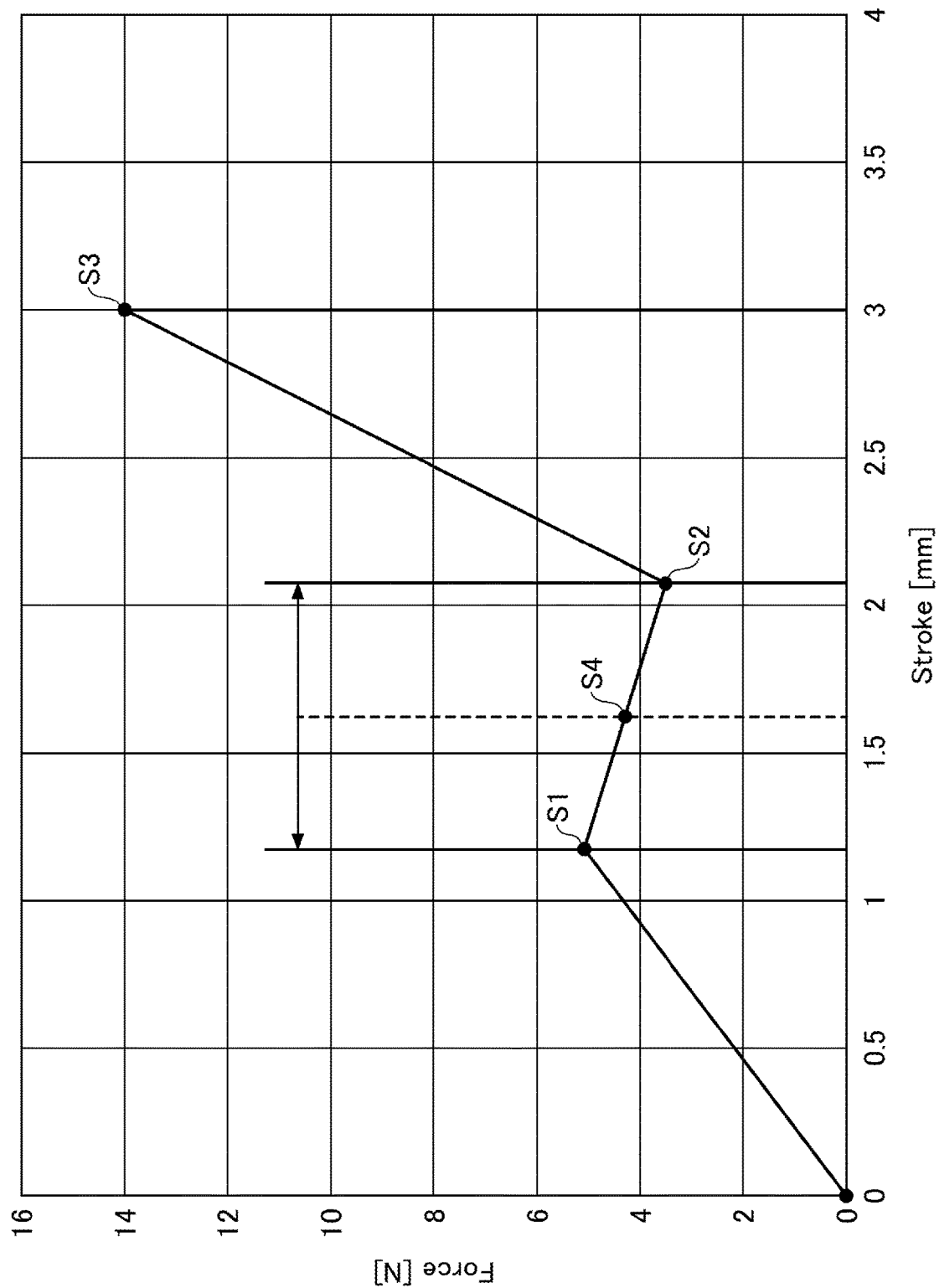
FIG. 10 is a graph illustrating one example of load characteristics of a pushing operation by an operation knob in the push-type input device according to one embodiment.

FIG. 10 is a graph illustrating one example of load characteristics of the pushing operation by the operation knob 102 in the push-type input device 100-1 according to one embodiment. In FIG. 10, the load characteristics of the pushing operation by the operation knob 102 are represented as a F/S curve. In the graph of FIG. 10, the vertical axis denotes an operation load, and the horizontal axis denotes a stroke amount. Note that, in one embodiment, for each of the operation knobs 102, the two rubber domes 106A having the same specification are used to double the operation load; however, this is by no means a limitation. For example, one single rubber dome may be used, or three or more rubber domes having different specifications may be combined.

As illustrated in FIG. 10, after the start of the pushing operation by the operation knob 102, until the stroke amount of the pushing operation reaches the stroke amount S1 in which the rubber dome 106A starts a reverse motion, the operation load according to the pushing operation by the operation knob 102 gradually increases as the rubber dome 106A is bent. Therefore, as illustrated in FIG. 10, the operation load according to the pushing operation by the operation knob 102 is the maximum load when the stroke amount of the pushing operation is the stroke amount S1.

Subsequently, until the stroke amount of the pushing operation reaches the stroke amount S2 in which the reverse motion of the rubber dome 106A ends, the operation load according to the pushing operation by the operation knob 102 gradually decreases as the rubber dome 106A exhibits the reverse motion. Therefore, as illustrated in FIG. 10, the operation load according to the pushing operation by the operation knob 102 is the minimum load when the stroke amount of the pushing operation is the stroke amount S2.

Subsequently, the pushing operation by the operation knob 102 pushes down the rubber dome 106A, and thus until the stroke amount by the pushing operation reaches the maximum stroke amount S3, the operation load according to the pushing operation by the operation knob 102 gradually increases.

Here, as illustrated in FIG. 10, the determination section 122 of the control device 120 performs the switch-on determination when the stroke amount of the pushing operation by the operation knob 102 is between the stroke amount S1 and the stroke amount S2. In particular, the determination section 122 performs the switch-on determination when the stroke amount of the pushing operation by the operation knob 102 is the middle stroke amount S4 between the stroke amount S1 and the stroke amount S2. More specifically, the switch-on determination is performed when the rotation angle state of the rotating body 105 rotationally driven by the slider 103 is detected by the sensor to be in an angle state corresponding to the stroke amount S4 of the operation knob 102.

Thereby, the push-type input device 100-1 according to one embodiment can perform the switch-on determination at approximately the same timing as the timing at which the operator has perceived a click sensation. In other words, until the switch-on determination performed after the operator has perceived the click sensation, the operator does not need to push the operation knob 102 anymore. Therefore, according to the push-type input device 100-1 according to one embodiment, it is possible to provide the more intuitive and reliable pushing operation involving the click operation sensation via the operation knob 102.

In particular, the push-type input device 100-1 according to one embodiment uses the rubber dome 106A that is elastically deformable by being compressed in response to the pushing operation, as "click sensation-imparting mechanism" and "dome-shaped elastic body". Thereby, the push-type input device 100-1 according to one embodiment can impart a click sensation to the pushing operation in a relatively simple and low-cost configuration as compared with a configuration using another component (e.g., a cam mechanism) as "click sensation-imparting mechanism". Note that, in the present embodiment, the rubber dome 106A is used as one example of "dome-shaped elastic body"; however, this is by no means a limitation. As another example of "dome-shaped elastic body", for example, a metal dome member that enables a reverse motion may be used.

Also, the push-type input device 100-1 according to one embodiment includes the magnet 105A retained by the rotating body 105 and uses, as one of the "sensor", the magnetic sensor 107C mounted on the board 107. Thereby, the push-type input device 100-1 according to one embodiment can detect the rotation angle of the rotating body 105 in a contactless manner.

Also, in the push-type input device 100-1 according to one embodiment, the magnet 105A and the magnetic sensor 107C are provided so as to face each other in a direction of the rotation axis of the rotating body 105. Thereby, the push-type input device 100-1 according to one embodiment has a relatively simple configuration in which the rotating body 105 is disposed above the board 107 so as to be rotatable such that the magnet 105A and the magnetic sensor 107C face each other, thereby realizing detection of the rotation angle of the rotating body 105 by the magnetic sensor 107C.

Also, the push-type input device 100-1 according to one embodiment has the upper cam surface 105Da in the rotating body 105, and the upper cam surface 105Da converts an operation force applied to the operation knob 102 to a rotation force of the rotating body 105. Thereby, the push-type input device 100-1 according to one embodiment has a relatively simple configuration that can rotate the rotating body 105 in response to the pushing operation by the operation knob 102. Also, the push-type input device 100-1 according to one embodiment can change the rotation amount, the rotation speed, and the like of the rotating body 105 by changing the profiles (e.g., inclination angle and length) of the upper cam surface 105Da.

(Configuration for Highly Accurately Performing Switch-on Determination)

Figure 11:
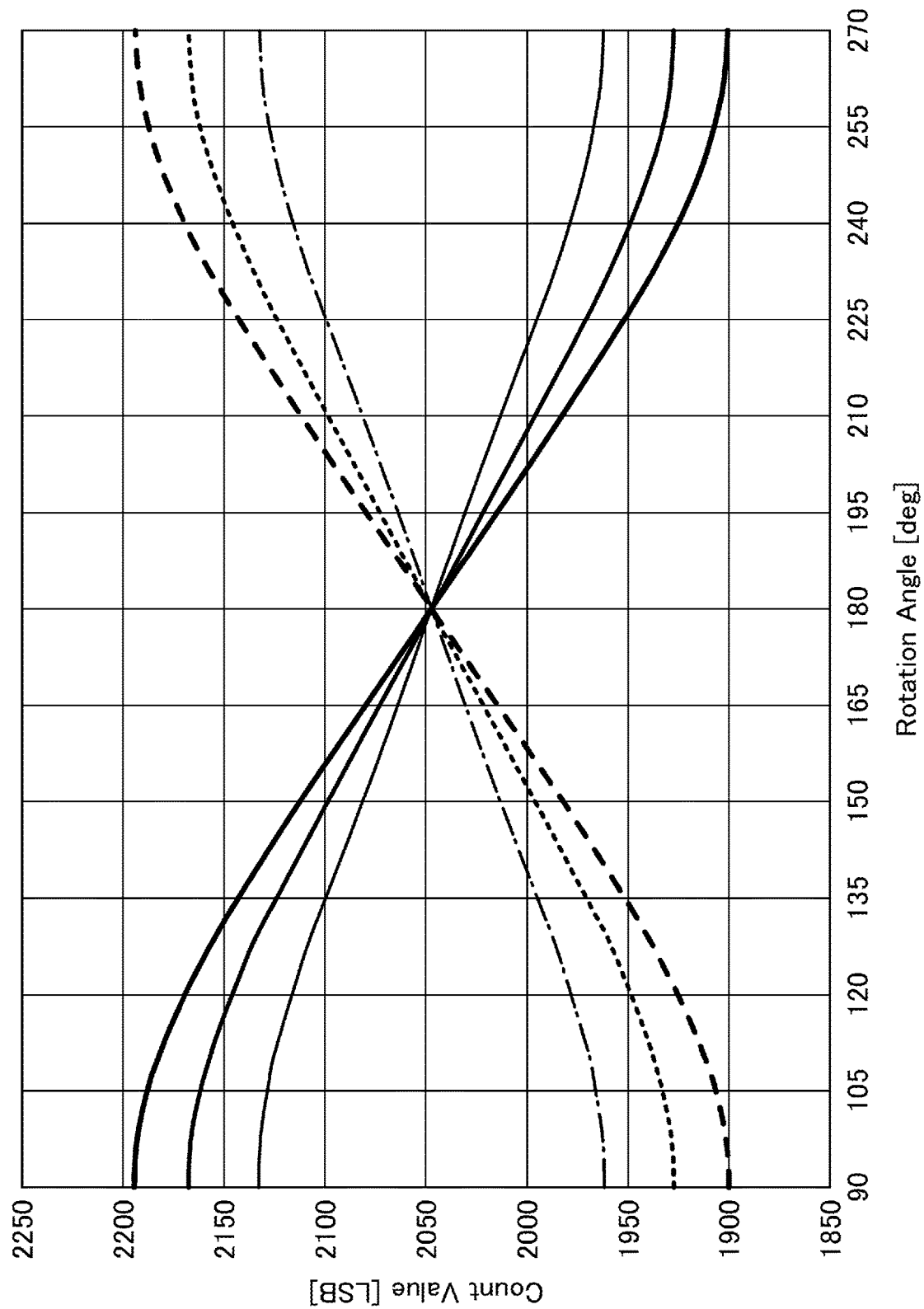
FIG. 11 is a graph illustrating output characteristics of a magnetic sensor (GMR sensor) included in the push-type input device according to one embodiment.
Figure 12:
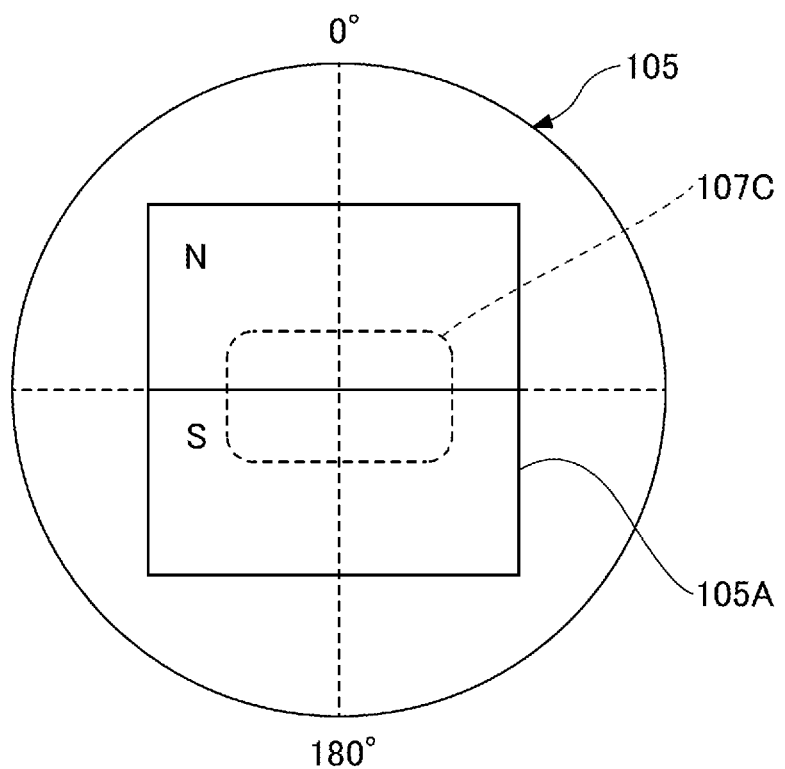
FIG. 12 schematically illustrates a rotation angle of a magnet at which detection accuracy of the magnetic sensor is the highest in the push-type input device according to one embodiment.

FIG. 11 is a graph illustrating output characteristics of the magnetic sensor 107C (GMR sensor) included in the push-type input device 100-1 according to one embodiment. FIG. 12 schematically illustrates the rotation angle of the magnet 105A at which detection accuracy of the magnetic sensor 107C is the highest in the push-type input device 100-1 according to one embodiment.

Note that, FIG. 11 illustrates changes in output voltage of the magnetic sensor 107C at 25° C., −40° C., and 105° C. As illustrated in FIG. 11, in the 0-degree direction and the 180-degree direction, the magnetic sensor 107C (GMR sensor) involves the smallest change in the output voltage caused by temperature drift, and thus the detection accuracy becomes the highest.

Therefore, as illustrated in FIG. 12, the set orientation of the magnet 105A and the set orientation of the magnetic sensor 107C (GMR sensor) in the push-type input device 100-1 according to one embodiment are adjusted so that the determination section of the control device 120 can perform the switch-on determination when the rotation angle of the magnet 105A is a rotation angle corresponding to the 0-degree direction or the 180-degree direction of the magnetic sensor 107C (GMR sensor) (i.e., when the boundary line between the N pole and the S pole of the magnet 105A is orthogonal to the 0-degree direction or the 180-degree direction of the magnetic sensor 107C (GMR sensor)).

In other words, the push-type input device 100-1 according to one embodiment is set to achieve an angle state corresponding to the above-described stroke amount S4 of the operation knob 102 when the rotation angle of the magnet 105A becomes a rotation angle at which the detection accuracy by the magnetic sensor 107C becomes the highest. Thus, the push-type input device 100-1 according to one embodiment can reliably perform the switch-on determination regardless of the ambient temperature. Therefore, according to the push-type input device 100-1 according to one embodiment, it is possible to perform the switch-on determination even more accurately.

(Relationship Between Stroke Amount and Rotation Angle)

Figure 13:
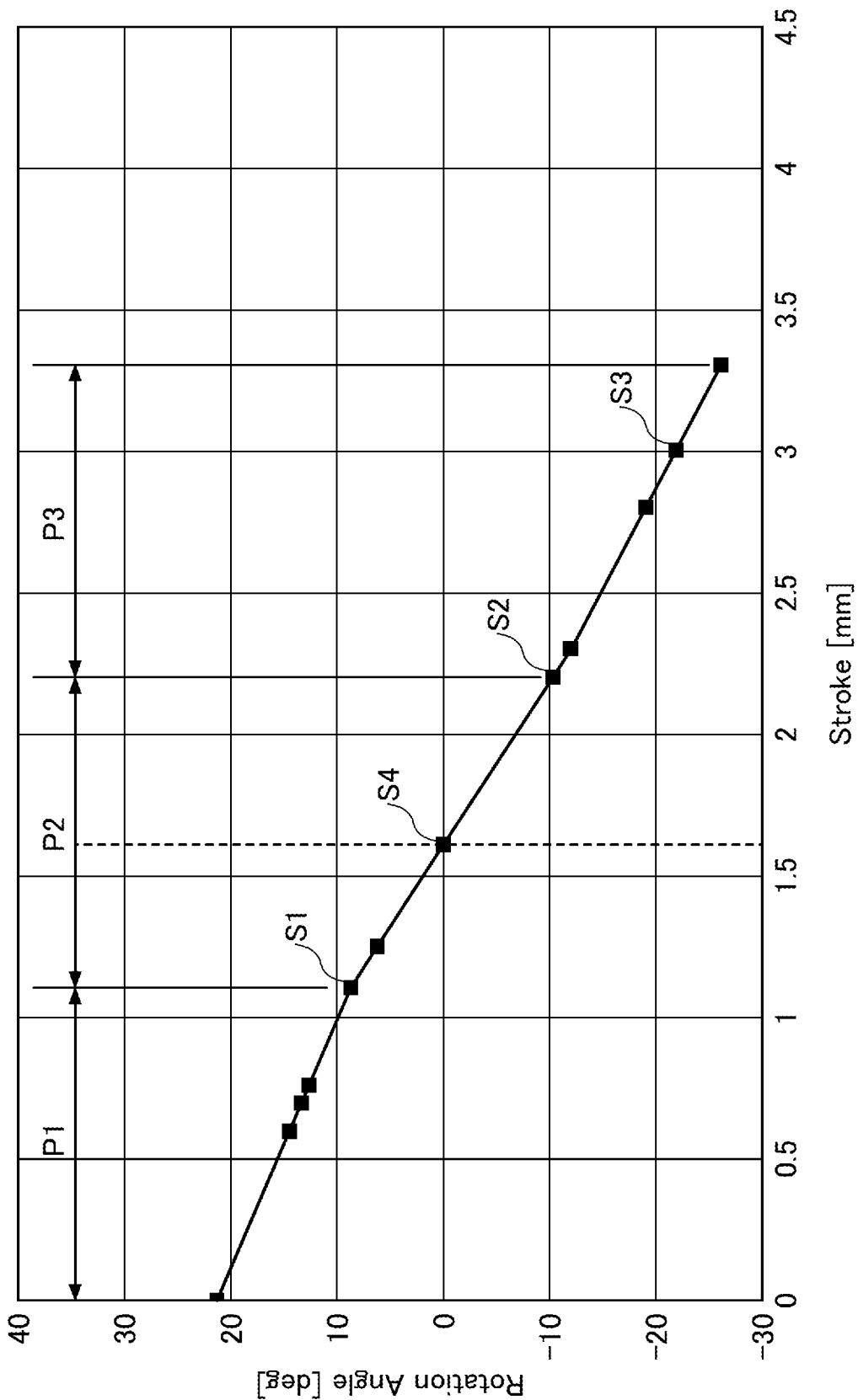
FIG. 13 is a graph illustrating a relationship between a stroke amount of the operation knob and the rotation angle of the rotating body in the push-type input device according to one embodiment.

FIG. 13 is a graph illustrating a relationship between the stroke amount of the operation knob 102 and the rotation angle of the rotating body 105 in the push-type input device 100-1 according to one embodiment.

As illustrated in FIG. 7, the upper cam surface 105Da provided in the rotating body 105 has the rotation starting portion P1, the rotation intermediate portion P2, and the rotation ending portion P3.

The rotation starting portion P1 and the rotation ending portion P3 have a relatively high inclination angle. Meanwhile, the rotation intermediate portion P2 has a relatively low inclination angle. Thereby, as illustrated in FIG. 13, the rotation amount of the rotation intermediate portion P2 per unit stroke amount is larger than the rotation amounts of the rotation starting portion P1 and the rotation ending portion P3. Note that, in one embodiment, the rotation intermediate portion P2 corresponds to a region between the stroke S1 and the stroke S2 of the operation knob 102 as illustrated in FIG. 10, and the determination section 122 of the control device 120 is set to perform the switch-on determination by detecting the rotation state in the region of the rotation intermediate portion P2, preferably the rotation state at the center position of the rotation intermediate portion P2 (corresponding to the stroke S4). Note that, the rotation intermediate portion P2 having the relatively low inclination angle can be set in a given region with respect to the stroke of the operation knob 102, and the switch-on determination is not necessarily performed at the center position as long as the switch-on determination is performed within the region of the rotation intermediate portion P2 having the relatively low inclination angle.

Thereby, the push-type input device 100-1 according to one embodiment can perform the switch-on determination when the rotation amount per unit stroke amount is relatively large. Thereby, the push-type input device 100-1 according to one embodiment does not readily receive influences such as variation in the detected value of the rotation angle, and can increase accuracy of the switch-on determination.

Note that, each of the push-type input devices 100-2 to 100-4 included in the push-type shifter device 10 according to one embodiment has the same configuration as the configuration of the push-type input device 100-1. Thereby, the push-type shifter device 10 according to one embodiment can provide a more intuitive and reliable pushing operation involving the click operation sensation via the operation knob 102 in response to the pushing operation of any of the push-type input devices 100-1 to 100-4.

In the above, one embodiment of the present invention has been described in detail. However, the present invention should not be construed as being limited to the above-described embodiment. Various modifications or changes are possible in the scope of the gist of the present invention that is recited in claims.

For example, in one embodiment, the "cam surface" is provided in the rotating body 105; however, this is by no means a limitation. The "cam surface" may be provided in the slider 103.

According to one embodiment, it is possible to provide a more intuitive and reliable pushing operation involving a click operation sensation via the operation knob.

What is claimed is:

1. A push-type input device, comprising:
    an operation knob configured to receive a pushing operation by an operator;
    a click sensation-imparting mechanism configured to impart a click sensation to the pushing operation;
    a slider configured to slide in a predetermined sliding direction in response to the pushing operation;
    a rotating body configured to rotate in response to sliding of the slider;
    a sensor configured to detect a rotation angle of the rotating body; and
    a determination section configured to perform a switch-on determination based on a detection result of the rotation angle by the sensor,
    wherein the click sensation-imparting mechanism is a dome-shaped elastic body that is elastically deformable by being compressed from the slider in response to the pushing operation.

2. The push-type input device according to claim 1, wherein the determination section performs the switch-on determination between the rotation angle of the rotating body corresponding to a maximum load in load characteristics of the pushing operation and the rotation angle of the rotating body corresponding to a minimum load in load characteristics of the pushing operation.

3. The push-type input device according to claim 1, further comprising a magnet retained by the rotating body,
    wherein the sensor is a magnetic sensor that is mounted on a board and configured to detect the rotation angle of the magnet retained by the rotating body.

4. The push-type input device according to claim 3, wherein the magnet and the magnetic sensor are provided to face each other in a direction of a rotation axis of the rotating body.

5. The push-type input device according to claim 3, wherein:
    a rotation amount of the rotating body per unit stroke amount of the slider is larger in a rotation intermediate time than in a rotation starting time and a rotation ending time, the rotation intermediate time being between the rotation starting time and the rotation ending time; and
    the determination section performs the switch-on determination with the rotating body being in the rotation intermediate time.

6. The push-type input device according to claim 3, wherein the determination section performs the switch-on determination with the rotation angle of the magnet being a predetermined rotation angle at which detection accuracy by the magnetic sensor becomes highest.

7. The push-type input device according to claim 1, wherein the slider or the rotating body includes a cam surface that converts a sliding force of the slider to a rotating force of the rotating body.

8. A push-type shifter device, comprising:
    a plurality of the push-type input devices according to claim 1.

9. A push-type input device comprising:
    an operation knob configured to receive a pushing operation by an operator;
    a click sensation-imparting mechanism configured to impart a click sensation to the pushing operation;
    a slider configured to slide in a predetermined sliding direction in response to the pushing operation;
    a rotating body configured to rotate in response to sliding of the slider;
    a sensor configured to detect a rotation angle of the rotating body;
    a determination section configured to perform a switch-on determination based on a detection result of the rotation angle by the sensor; and
    a biasing unit configured to bias the rotating body in a returning rotational direction, wherein:
    the rotating body includes an upper cam surface on a helical cam portion provided on an outer peripheral surface thereof;
    the slider includes an upper sliding portion that rotates the rotating body by sliding over the upper cam surface in accordance with downward sliding of the slider; and
    the upper cam surface of the rotating body is always biased by a biasing force of the biasing unit toward a direction in which the upper cam surface of the rotating body is pushed onto the upper sliding portion of the slider.

10. The push-type input device according to claim 9, further comprising a magnet retained by the rotating body,
    wherein the sensor is a magnetic sensor that is mounted on a board and configured to detect the rotation angle of the magnet retained by the rotating body.

11. The push-type input device according to claim 10, wherein the magnet and the magnetic sensor are provided to face each other in a direction of a rotation axis of the rotating body.

12. The push-type input device according to claim 9, wherein the click sensation-imparting mechanism is a dome-shaped elastic body that is elastically deformable by being compressed from the slider in response to the pushing operation.

13. The push-type input device according to claim 9, wherein:
    the rotating body includes a lower cam surface on a rear side of the upper cam surface in the helical cam portion provided on the outer peripheral surface;
    the slider further includes a lower sliding portion provided at a position facing the upper sliding portion via the cam portion;
    the lower sliding portion has a gap with the lower cam surface upon the downward sliding of the slider, and upon upward sliding of the slider, only in a case in which the rotating body is not able to rotate in the returning rotational direction by the biasing force from the biasing unit, the lower sliding portion rotates the rotating body in the returning rotational direction by contacting and sliding over the lower cam surface in accordance with the upward sliding of the slider.

14. The push-type input device according to claim 9, wherein each of the upper cam surface and the upper sliding portion is inclined such that a height position thereof decreases outward in a radial direction of the rotating body.

\* \* \* \* \*